United States Patent [19]

Garg et al.

[11] Patent Number: 4,863,767
[45] Date of Patent: Sep. 5, 1989

[54] METHOD OF ADHESIVE BONDING BY USE OF THERMOTROPIC LIQUID CRYSTAL POLYMERS

[75] Inventors: Sunil K. Garg, Summit, N.J.; Samuel Kenig, Haifa, Israel

[73] Assignee: Hoechst Celanese Corporation, Somerville, N.J.

[21] Appl. No.: 600,271

[22] Filed: Apr. 13, 1984

[51] Int. Cl.$^4$ ............................................. C09K 19/00
[52] U.S. Cl. ................................... 428/1; 156/244.24; 156/306.6; 156/308.2; 156/327; 196/332; 427/398.1; 528/176; 528/190
[58] Field of Search .................... 156/244.24, 327, 332, 156/306.6, 308.2; 427/398.1; 428/1; 528/176, 190; 252/299.63

[56] References Cited

U.S. PATENT DOCUMENTS

| | | | |
|---|---|---|---|
| 3,160,604 | 12/1964 | Holub et al. | 156/332 |
| 3,723,388 | 3/1973 | Bell et al. | 528/193 |
| 4,384,016 | 5/1983 | Ide et al. | 156/308.2 |

*Primary Examiner*—John J. Gallagher
*Attorney, Agent, or Firm*—Burns, Doane, Swecker & Mathis

[57] ABSTRACT

An improved method of bonding a polymeric composition comprised of a thermotropic liquid crystalline polymer to a substrate is provided. It has been determined that the adhesion of a thermotropic liquid crystalline polymer to a substrate is enhanced if the absolute difference between the surface pH of the substrate to which the polymer is to be bonded and the pH of the polymer itself is at least approximately 1.0 pH unit as measured by the method described herein.

20 Claims, No Drawings

METHOD OF ADHESIVE BONDING BY USE OF THERMOTROPIC LIQUID CRYSTAL POLYMERS

BACKGROUND OF THE INVENTION

The present invention relates to the use of thermotropic liquid crystal polymers as adhesives.

It has been known for some time that certain polymers which are capable of forming an anisotropic melt phase (i.e., thermotropic liquid crystal polymers) can be employed as hot melt adhesives. See, for example, U.S. Pat. Nos. 3,778,410; 3,804,805; and 3,890,256; and European Patent Application No. 0089170. While such compositions exhibit desirable thermal and chemical resistance, it is still desirable to provide a method of fusion bonding to a substrate by use of thermotropic liquid crystal polymers whereby the physical properties of the bond are enhanced by maximizing the strength of the bond due to increased adhesion of the polymer to the substrate.

In commonly assigned U.S. Ser. No. 464,272, filed Feb. 7, 1983(now U.S. Pat. No. 4,458,039), entitled "Thermotropic Liquid Crystalline Polymer Blend With Reduced Surface Abrasion" is disclosed a thermotropic liquid crystalline polymer matrix having wollastonite fibers of a specified average aspect ratio incorporated therein.

OBJECTS AND SUMMARY OF THE INVENTION

It is therefore an object of the present invention to provide an improved method of bonding a polymeric composition to a substrate.

It is also an object of the present invention to provide a method of adhesive bonding whereby a bond possessing enhanced physical properties is produced.

It is further an object of the present invention to provide an improved method for the production of a laminate.

It is further an object of the present invention to provide a bonded article having enhanced bond physical characteristics.

In one aspect of the present invention, there is provided an improved method for coating a substrate which comprises:
 (a) providing a substrate to be coated;
 (b) providing a polymeric composition in contact with the surface of the substrate to be coated, the composition comprising a polymer which is capable of forming an anisotropic melt phase and which is heated to a temperature of at least the softening temperature of the polymer while in contact with the surface, with the proviso that the absolute difference between the pH exhibited by the surface of the substrate to be coated and the pH of the surface of the polymer is at least approximately 1.0 pH unit; and
 (c) permitting the polymer to cool below the softening temperature to bond polymer to the substrate.

In another aspect of the present invention, there is provided an improved method for adhesively bonding two substrates together by use of an adhesive composition which comprises:
 (a) providing two substrates which are to be bonded together;
 (b) providing an adhesive composition between and in contact with opposing surfaces of the substrates, the composition comprising a polymer which is capable of forming an anisotropic melt phase and which is heated to a temperature of at least the softening temperature of the polymer, with the proviso that the absolute difference between the pH exhibited by the surfaces of the substrates to be bonded together and the pH of the surface o the polymer is at least approximately 1.0 pH unit; and
 (c) permitting the polymer to cool below the softening temperature to bond the substrates together whereby the thickness of the adhesive composition which constitutes the bond between the substrates is approximately 1 to 15 mils.

In yet another aspect of the present invention there is provided an improved method for the production of a laminate comprising:
 (a) providing a first substrate;
 (b) providing a polymeric composition in contact with at least one surface of the first substrate, the polymeric composition comprising a polymer which is capable of forming an anisotropic melt phase and which is heated to a temperature of at least the softening temperature of the polymer;
 (c) providing a second substrate;
 (d) placing the second substrate in contact with the polymeric composition; and
 (e) permitting the polymer to cool below the softening temperature to bond the first and second substrates together whereby the thickness of the resulting polymeric bond ranges from approximately 1 to 15 mils, with the proviso that the absolute difference between the pH of the surface of the first and second substrates which contact the polymer and the pH of the surface of the polymer is at least approximately 1.0 pH unit.

In yet another aspect of the present invention, there are provided coated or bonded articles produced in accordance with the above methods.

DETAILED DESCRIPTION OF THE INVENTION

Thermotropic liquid crystalline polymers are polymers which are liquid crystalline (i.e., anisotropic) in the melt phase. These polymers have been described by various terms, including "liquid crystalline", "liquid crystal" and "anisotropic". Briefly, the polymers of this class are thought to involve a parallel ordering of the molecular chains. The state wherein the molecules are so ordered is often referred to either as the liquid crystal state or the nematic phase of the liquid crystalline material. These polymers are prepared from monomers which are generally long, flat and fairly rigid along the long axis of the molecule and commonly have chain-extending linkages that are either coaxial or parallel.

Such polymers readily form liquid crystals (i.e., exhibit anisotropic properties) in the melt phase. Such proper ties may be confirmed by conventional polarized light techniques whereby crossed polarizers are utilized. More specifically, the anisotropic melt phase may be confirmed by the use of a Leitz polarizing microscope at a magnification of 40× with the sample on a Leitz hot stage and under nitrogen atmosphere. The polymer is optically anisotropic; i.e., it transmits light when examined between crossed polarizers. Polarized light is transmitted when the sample is optically anisotropic even in the static state.

Thermotropic liquid crystalline polymers include but are not limited to wholly aromatic polyesters, aromatic-aliphatic polyesters, aromatic polyazomethines, aromatic polyester-carbonates and wholly or non-wholly aromatic polyester-amides The wholly aromatic polymers are considered to be "wholly" aromatic in the sense that each moiety present in the polymer contributes at least one aromatic ring to the polymer backbone and which enables the polymer to exhibit anisotropic properties in the melt phase.

Such moieties may be formed from aromatic diols, aromatic amines, aromatic diacids and aromatic hydroxy acids. Moieties which may be present in the thermotropic liquid crystal polymers (wholly or non-wholly aromatic) suitable for use in the present invention include but are not limited to the following:

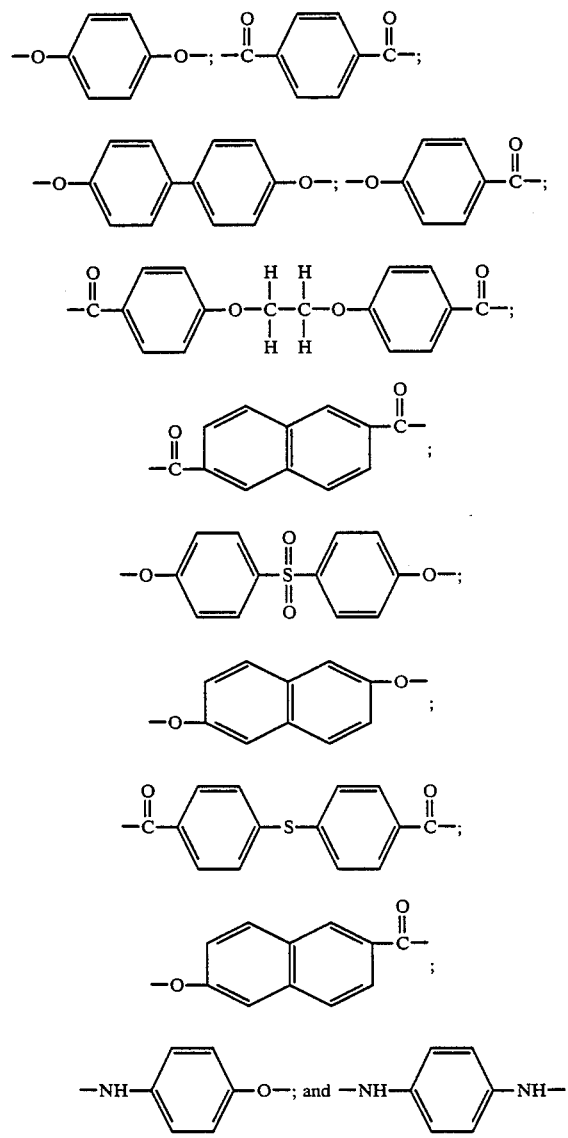

For the purposes of the present invention, the aromatic rings which are included in the polymer backbones of the polymer components may include substitution of at least some of the hydrogen atoms present upon an aromatic ring. Such substituents include alkyl groups of up to four carbon atoms; alkoxy group having up to four carbon atoms; halogens; and additional aromatic rings, such as phenyl and substituted phenyl. Preferred halogens include fluorine, chlorine and bromine. Suitable phenyl substituents include alkyl groups of up to four carbon atoms; alkoxy groups of up to four carbon atoms; and halogen.

Specific examples of suitable aromatic-aliphatic polyesters are copolymers of polyethylene terephthalate and hydroxybenzoic acid as disclosed in *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1–4. A further disclosure of such copolymers can be found in "Liquid Crystal Polymers: I. Preparation and Properties of p-Hydroxybenzoic Acid Copolymers," *Journal of Polymer Science, Polymer Chemistry Edition*, Vol. 14, pp. 2043–58 (1976), by W. J. Jackson, Jr. and H. F. Kuhfuss. The above-cited references are herein incorporated by reference in their entirety.

Aromatic polyazomethines and processes of preparing the same are disclosed in the U.S. Patent Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrilo-2-methyl-1,4-phenylenenitriloethylidyne-1,4-phenyleneethylidyne); poly(nitrolo-2-methyl-1,4-phenylenenitrilomethylidyne-1,4-phenylenemethylidyne); and poly(nitrilo-2-chloro-1,4-phenylenenitrilomethylidyne-1,4-phenylenemethylidyne).

Aromatic polyester-carbonates are disclosed in U.S. Pat. Nos. 4,107,143; 4,284,757 and 4,371,660, which are herein incorporated by reference in their entirety. Examples of such polymers include those consisting essentially of p-oxybenzoyl units, p-dioxyphenyl units, dioxycarbonyl units, and terephthoyl units.

Aromatic polyester-amides and processes of preparing the same are disclosed in the U.S. Patent Nos. 4,182,842; 4,330,457; 4,339,375; 4,341,688; 4,351,917, 4,351,918, and 4,355,132. Further disclosure of such copolymers can be found in "Liquid Crystal Polymers: III reparation and Properties of Poly(Ester Amides) from p-Aminobenzoic Acid and Poly(Ethylene Terephthalate)", *Journal of Applied Polymer Science*, Vol. 25 pp. 1685–1694 (1980), by W. J. Jackson, Jr. and H. F. Kuhfuss. The above cited disclosures are herein incorporated by reference in their entirety.

Recent publications disclosing thermotropic wholly aromatic polyesters include (a) Belgian Pat. Nos. 828,935 and 828,936, (b) Dutch Pat. No. 7505551, (c) West German Pat. Nos. 2,520,819, 2,520,820, and 2,722,120, (d) Japanese Pat. Nos. 43-223, 2132-116, 3017-692, and 3021-293, (e) U.S. Pat. Nos. 3,991,013; 3,991,014; 4,057,597; 4,066,620; 4,075,262; 4,118,372; 4,146,702; 4,153,779; 4,156,070; 4,159,365; 4,169,933; 4,181,792; 4,188,476; 4,201,856; 4,226,970; 4,232,143; 4,232,144; 4,238,600; 4,245,082; etc. and (f) U.K. Application No. 2,002,404.

Wholly aromatic polymers which are preferred for use in the present invention include wholly aromatic polyesters and polyester-amides which are disclosed in commonly assigned U.S. Pat. Nos. 4,067,852; 4,083,829; 4,130,545; 4,161,470; 4,184,996; 4,219,461; 4,224,433; 4,230,817; 4,238,598; 4,238,599; 4,256,624; 4,279,803; 4,299,756; 4,330,457; 4,337,191; 4,339,375; 4,341,688; 4,351,917; 4,351,918; and 4,355,132. The disclosures of all of the above-identified commonly assigned U.S. patents are herein incorporated by reference in their entirety. The wholly aromatic polymers disclosed therein typically are capable of forming an anisotropic melt phase at a temperature below approximately 400° C., and preferably below approximately 350° C.

The polymers such as wholly aromatic polyesters and polyester-amides which are suitable for use in the present invention may be formed by a variety of ester-forming techniques whereby organic monomer compounds possessing functional groups which, upon condensation, form the requisite recurring moieties are reacted. For instance, the functional groups of the organic monomer compounds may be carboxylic acid groups, hydroxyl groups, ester groups, acyloxy groups, acid halides, amine groups, etc. The organic monomer compounds may be reacted in the absence of a heat exchange fluid via a melt acidolysis procedure. They, accordingly, may be heated initially to form a melt solution of the reactants with the reaction continuing as the polymer particles are suspended therein. A vacuum may be applied to facilitate removal of volatiles formed during the final stage of the condensation (e.g., acetic acid or water).

Commonly assigned U.S. Pat. No. 4,083,829, entitled "Melt Processable Thermotropic Wholly Aromatic Polyester," describes a slurry polymerization process which may be employed to form the wholly aromatic polyesters which are preferred for use in the present invention. According to such a process, the solid product is suspended in a heat exchange medium. The disclosure of this patent has previously been incorporated herein by reference in its entirety.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., sodium acetate, potassium acetate, zinc acetate), the gaseous acid catalysts such as Lewis acids (e.g., BF$_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polymers suitable for use in the present invention tend to be substantially insoluble in common solvents and accordingly are not susceptible to solution processing. As discussed previously, they can be readily processed by common melt processing techniques. Most suitable wholly aromatic polymers are soluble in pentafluorophenol to a limited degree.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic polyester-amides which are preferred commonly exhibit a molecular weight of about 5,000 to 50,000 and preferably about 10,000 to 30,000; e.g., 15,000 to 17,000. Such molecular weight may be determined by gel permeation chromatography as well as by other standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters and polyester-amides additionally commonly exhibit an inherent viscosity (i.e., I.V.) of at least approximately 2 0 dl./g., e.g., approximately 2.0 to 10.0 dl./g., when dissolved in a concentration of 0.1 percent by weight in pentafluorophenol at 60° C.

Especially preferred wholly aromatic polyesters and polyester-amides are those which are disclosed in above-noted U.S. Pat. Nos. 4,161,470, 4,184,996; 4,219,461; 4,256,624; and 4,330,457. Preferably, the wholly aromatic polyester comprises not less than about 10 mole percent of recurring units which include a naphthalene moiety such as 6-oxy-2-naphthoyl, 2,6-dioxynaphthalene, and 2,6-dicarboxynaphthalene The wholly aromatic polyester which is disclosed in U.S. Pat. No. 4,161,470 is a melt processable wholly aromatic polyester capable of forming an anisotropic melt phase at a temperature below approximately 350° C. The polyester consists essentially of the recurring moieties I and II wherein:

I is

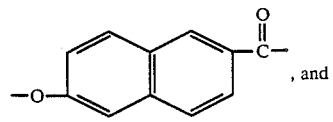, and

II is

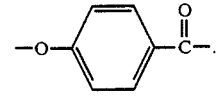.

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 75 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof. Exemplary phenyl substituents include an alkyl group of 1 to 4 carbon atoms, an alkoxy group of 1 to 4 carbon atoms and halogen.

The wholly aromatic polyester which is disclosed in U.S. Pat. No. 4,184,996 is a melt processable wholly aromatic polyester capable of forming an anisotropic melt phase at a temperature below approximately 325° C. The polyester consists essentially of the recurring moieties I, II, and III wherein:

I is

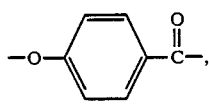

II is

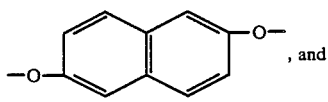, and

III is

The polyester comprises approximately 30 to 70 mole percent of moiety I. The polyester preferably comprises approximately 40 to 60 mole percent of moiety I, approximately 20 to 30 mole percent of moiety II, and approximately 20 to 30 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof. Exemplary phenyl substituents include a alkyl group of 1 to 4 carbon atoms, an alkoxy group of 1 to 4 carbon atoms and halogen.

The polyester disclosed in U.S. Pat. No. 4,219,461 is a melt processable wholly aromatic polyester which is capable of forming an anisotropic melt phase at a temperature below approximately 320° C. The polyester consists essentially of the recurring moieties I, II, III, and IV wherein:

I is

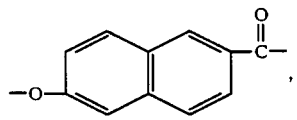

II is

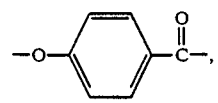

III is a dioxy aryl moiety of the formula —O—Ar—O— wherein Ar is a divalent radical comprising at least one aromatic ring, and IV is a dicarboxyl aryl moiety of the formula

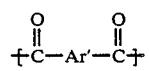

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV. The polyester preferably comprises approximately 20 to 30 (e.g., approximately 25) mole percent of moiety I, approximately 25 to 40 (e.g., approximately 35) mole percent of moiety II, approximately 15 to 25 (e.g., approximately 20) mole percent of moiety III, and approximately 15 to 25 (e.g., approximately 20) mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof. Exemplary phenyl substituents include an alkyl group of 1 to 4 carbon atoms, an alkoxy group of 1 to 4 carbon atoms and halogen.

Moieties III and IV are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, non-symmetrical moieties such as those derived from resorcinol and isophthalic acid, may also be used.

Preferred moieties III and IV are set forth in above-noted U.S. Pat. No. 4,219,461. The preferred dioxy aryl moiety III is:

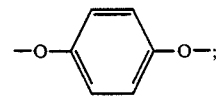

and the preferred dicarboxy aryl moiety IV is:

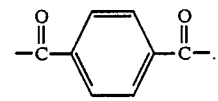

The polyester disclosed in U.S. Pat. No. 4,256,624 is a melt processable wholly aromatic polyester which is capable of forming an anisotropic melt phase at a temperature below approximately 400° C. The polyester consists essentially of the recurring moieties I, II and III wherein:

I is

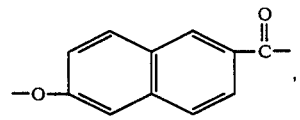

II is a dioxy aryl moiety of the formula —O—Ar—O— where Ar is a divalent radical comprising at least one aromatic ring, and III is a dicarboxy aryl moiety of the formula

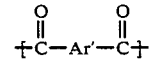

where Ar' is a divalent radical comprising at least one aromatic ring, and wherein the polyester comprises approximately 10 to 90 mole percent of moiety I, approximately 5 to 45 mole percent of moiety II, and approximately 5 to 45 mole percent of moiety III. The polyester preferably comprises approximately 20 to 80 mole percent of moiety I, approximately 10 to 40 mole percent of moiety II, and approximately 10 to 40 mole percent of moiety III. The polyester more preferably comprises approximately 60 to 80 mole percent of moiety I, approximately 10 to 20 mole percent of moiety II, and approximately 10 to 20 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof. Exemplary phenyl substituents include an alkyl group of 1 to 4 carbon atoms, an alkoxy group of 1 to 4 carbon atoms and halogen.

As with moieties III and IV of the polyester disclosed in U.S. Pat. No. 4,219,461, moieties II and III of the polyester described immediately above may be symmetrical or nonsymmetrical, but are preferably symmetrical.

Preferred moieties II and III are set forth in above-noted U.S. Pat. No. 4,256,624. The preferred dioxy aryl moiety II is:

and the preferred dicarboxy aryl moiety III is:

U.S. Pat. No. 4,330,457, discloses a melt processable polyester-amide which is capable of forming an anisotropic melt phase at a temperature below approximately 400° C. The polyesteramide consists essentially of the recurring moieties I, II, III and optionally IV wherein:

I is

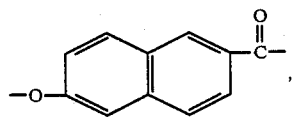

II is

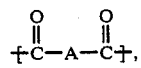

where A is a divalent radical comprising at least one aromatic ring or a divalent transcyclohexane radical;

III is $\{Y-Ar-Z\}$, where Ar is a divalent radical comprising at least one aromatic ring, Y is O, NH, or NR, and Z is NH or NR, where R is an alkyl group of 1 to 6 carbon atoms or an aryl group; and IV is $\{O-Ar'-O\}$, where Ar' is a divalent radical comprising at least one aromatic ring;

and wherein said polyester-amide comprises approximately 10 to 90 mole percent of moiety I, approximately 5 to 45 mole percent of moiety II, approximately 5 to 45 percent of moiety III, and approximately 0 to 40 mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof. Exemplary phenyl substituents include an alkyl group of 1 to 4 carbon atoms, an alkoxy group of 1 to 4 carbon atoms, and halogen.

Preferred moieties II, III and IV are set forth in above-noted U.S. Pat. No. 4,330,457. The preferred dicarboxy aryl moiety II is:

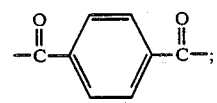

the preferred moiety III is:

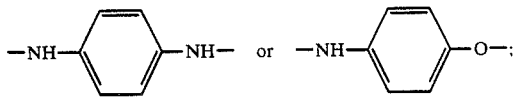

and the preferred dioxy aryl moiety IV is:

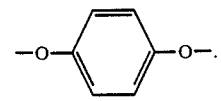

The term "substrate" as used in the context of the present invention specifies a non-particulate material which is capable of serving as a foundation or groundwork for the polymeric composition specified herein. Such material is preferably but not necessarily continuous and broad in configuration, and may be in the form of a solid sheet, layer, etc. In a preferred embodiment the substrate is metallic or ceramic in nature.

The present improved method for adhesively bonding a polymeric composition to at least one surface of a substrate to either provide a coating or to bond two or more substrates together can be practiced in accordance with various embodiments whereby a polymer capable of forming an anisotropic melt phase is placed in contact with at least one surface of a substrate. It has been determined in accordance with the concept of the present invention that the adhesion of such polymer to the substrate is enhanced if the absolute difference between the pH of the surface of the substrate and the pH of the surface of the polymer is at least about 1.0 pH unit (as determined by the method discussed hereinafter).

The polymer can either be in the form of a melt, in a heat softened state, or in a substantially solid form when initially contacted with the substrate. If in a substantially solid form, the polymer may be heated to a temperature of at least the softening temperature of the polymer or preferably to a temperature of at least the differential scanning calorimetric peak melting temperature of the polymer subsequent to being placed in contact with the substrate. The polymer may also be heated to a temperature of at least the softening temperature or preferably to a temperature of at least the differential scanning calorimetry peak melting temperature prior to being placed in contact with the substrate. Once the polymer, in either instance, is at a temperature of at least its softening temperature and contacts the surface of the substrate, the polymer is then permitted to cool below the softening temperature of the polymer to bond the polymer to the substrate.

In the context of the present invention the "softening temperature" is the temperature at which the polymer begins to flow while under a pressure of 5000 psi. In the context of the present invention the "differential scanning calorimetry peak melting temperature" is the temperature at which one observes a melt endotherm peak when a polymer sample is being heated at a 20° C./minute heating rate while under a nitrogen atmosphere. The "softening temperature" and "differential scanning calorimetry peak melting temperature" will be influenced by the chemical composition of the polymeric material which is capable of forming an anisotropic melt phase. Commonly the "softening temperature" will be approximately 250° C. and will commonly not be observed more than approximately 40° C. below the differential scanning calorimetry peak melting temperature of the polymeric material.

The polymer may be initially placed in contact with the substrate in the form of an extruded sheet. The sheet can then be heated to a temperature of at least the softening temperature of the polymer to bond the polymer to the substrate with the polymer subsequently being permitted to cool.

Generally, the polymer will be heated to a temperature between the softening temperature of the polymer and about 3 centigrade degrees and preferably less than 20 centigrade degrees in excess of the differential scanning calorimetry peak melting temperature. Heating to a greater extent may subject the polymer to undesirably high temperatures wherein the polymer may flow excessively with loss of molecular orientation and/or degradation may occur.

The method of the present invention can also be practiced by means of additional embodiments. For example, the polymer can be placed between and in contact with two substrates (which may or may not be of like material) to bond the substrates together. In addition, one surface of a first substrate can be initially coated with the polymer, with a second substrate subsequently being placed in contact with the polymer and bonded thereto to provide a laminate.

More specifically, the substrate and extruded polymer sheet may be joined together by a co-lamination process where a sandwich-type structure is formed. In this instance, the substrate(s) would be heated to at least about the softening temperature of the polymer and the entire composite passed through heated calendering rolls. Pressures on the order of approximately 500 to 5000 psi, or more, would be employed. An alternative process comprises the coating of the substrate(s) with the polymer in a molten state by use of a cross-head die followed by calendering to provide a smooth surface. The coated substrates can then be pressed together at an appropriate temperature of at least the softening temperature of the polymer while at pressures of approximately 500 to 5000 psi, or more.

Extruded sheets of the liquid crystalline polymer which may be employed as the source of the polymeric material may be produced in any conventional manner. Extrusion of the polymer under suitable temperature and pressure conditions through a slit die of appropriate size to form a sheet is a preferred method of production. It is to be understood that the term "sheet" as used herein includes any of the various relatively thin, substantially flat structures which may be known in the art as sheets, slabs, films, etc. The thickness of the sheet does exert an influence upon the bonding strength ultimately attained as discussed hereafter.

The particular extrusion apparatus used is not critical and any suitable apparatus may be used herein. Examples of suitable extrusion apparatus are described in *Plastics Engineering Handbook of the Society of the Plastics Industry, Inc.,* Fourth Edition, edited by Joel Frados, Van Nostrand Reinhold Company (1976), pages 156–203.

The conditions of temperature and pressure under which the liquid crystalline polymer can be extruded to form the sheets are not critical to the present invention and can easily be determined by one of ordinary skill in the art. Typically, thermotropic liquid crystalline polymers can be extruded at a temperature within the range of approximately 250° C. to 350° C. (depending upon the melting temperature of the polymer) and at a pressure within the range of approximately 100 p.s.i. to 5,000 psi, or more.

As noted previously, it has been unexpectedly and surprisingly discovered that the adhesion of the liquid crystalline polymer to a surface of a substrate is enhanced if the absolute difference between the pH of the substrate surface and the pH of the liquid crystalline polymer surface is at least approximately 1.0 pH unit, and preferably at least approximately 2.0 pH units, and most preferably at least approximately 5.0 pH units. In accordance with the concept of the present invention the pH of the surface of the substrate commonly ranges from approximately 2 to 12, and the pH of the polymer commonly ranges from 6 to 8 while maintaining the specified absolute pH difference. For the purposes of the present invention, the pH is measured by the method which follows.

A powder derived from either the polymer surface or the substrate surface contemplated for use in the present invention is suspended at room temperature (i.e., approximately 25° C.) in a dilute solution of a suitable pH indicator in order to observe any color change which may occur; i.e., one drop of pH indicator is placed in about 10 milliliters of water together with 200 milligrams of the powder to be tested. Such methods are well known to those skilled in the art and are further discussed in K. Tanabe, *Solid Acids and Bases,* Academic Press, New York, pages 5–38 (1970), herein incorporated by reference.

The theory whereby the improved bonding results of the present invention are accomplished is considered to be complex and incapable of simple explanation. It is believed, however, that the specified pH differential serves to beneficially accomplish orientation of the molecules of the polymer (perhaps via homeotropic orientation) adjacent the surface of the substrate which is being bonded.

Exemplary materials are set forth in Table I below together with the pH exhibited by the surface thereof as determined by the method noted above:

TABLE I

Surface pH of Exemplary Materials

| Material | pH | Indicator | Color Change |
|---|---|---|---|
| $TiO_2$ | 5.0 | Alizarin | Red to Yellow |
| | | Congo Red | Blue to Reddish |
| Wollastonite (Wollastokup KR 38-2) | 9.0 to 9.5 | Bromothymol Blue Phenolphthalein | Yellow to Blue Colorless to Pinkish |
| Sodium Borosilicate Glass (Emerson & Cumings MC37) | 12.0 | Alizarin | Red to Purple |
| Soda Lime Glass (3M B37/2000) | 9.0 | Rosolic Acid Phenolphthalein | Yellow to Red Colorless to Slight Pink |
| Borosilicate Glass (Emerson & Cumings FTD 202) | 7.2 | Alizarin | Yellow to Red |
| Silica (Emerson & Cumings SI) | 6.8 to 7.2 | Brilliant Yellow | Orange to Yellow |

Exemplary thermotropic liquid crystalline polymers are set forth in Table II below together with the pH exhibited thereby as determined by the method set forth above:

TABLE II pH of Exemplary Liquid Crystalline Polymers

| Polymer | Surface pH | Indicator | Color Change |
|---|---|---|---|
| A | 6.6–6.8 | Phenol Red | Red to Yellowish |
| B | 6.6–6.8/7.5 | Phenol Red Orange II Alizarin | Red to Yellowish Amber to Yellow No Change |

Polymer A is described in U.S. Pat. No. 4,161,470 and comprised 73 mole percent of p-oxybenzoyl moiety and 27 mole percent of 6-oxy-2-naphthoyl moiety.

Polymer B is described in U.S. Pat. No. 4,330,457 and comprised 60 mole percent of 6-oxy-2-naphthoyl moiety, 20 mole percent of terephthaloyl moiety, and 20 mole percent of p-oxyphenylamino moiety. Also as indicated, Polymer B exhibited a pair of surface pH values indicating that both slightly acidic and slightly alkaline sites are present.

It will be apparent that, as a practical matter, an unsatisfactory bond may be produced due to the presence of an inadequate amount of adhesive between the substrates if the polymeric bonding layer is too thin, even taking into account the advantages provided by the present invention. Also, bond thicknesses which are too great will yield diminished properties. Generally, the bond strength will be satisfactory if the thickness of the bond ranges from approximately 1 to 15 mils, and preferably from approximately 6 to 12 mils. In those instances when the pH difference between the substrate and the polymeric material is great it is possible to tolerate increased bond thicknesses.

It should be noted that the surface to be bonded of the substrate need not inherently possess a pH of sufficient magnitude to provide the requisite absolute difference in pH but may be treated in a suitable manner to modify the pH thereof by, for example, a pre-treatment step prior to the bonding step. More specifically, the surface of a metallic sheet may be treated to enhance the surface energy thereof. Various surface treatments are well known to those skilled in the art whereby the surface of a substrate can be modified. For example, aluminum may be treated by the Forest Product Laboratories (FPL) chromic acid/sulfuric acid etching process and cold rolled steel may be modified by a phosphate treatment.

An advantage of the use of the thermotropic liquid crystalline polymer resides in the fact that the coated or bonded article may be employed in an environment wherein a more conventional polymer may be susceptible to degradation, etc. but wherein the substrate is not subject to degradation. Such environments include high temperature environments (e.g., temperatures in excess of about 200° C.) and applications where the polymer may be subject to chemical attack by solvents, acids, etc. Thermotropic liquid crystalline polymers possess desirable resistance to chemical and thermal degradation. Such polymers also perform well under high humidity conditions.

Furthermore, the polymers possess significant dielectric strength which renders them suitable for use in environments where such properties are advantageous. Such dielectric strength desirably exceeds about 1000 V./mil.

The mechanical properties of coated or bonded articles produced in accordance with the present invention can be improved still further by subjecting the polymer to a heat treatment following formation of the coated or bonded article. The heat treatment improves the strength and stability of the polymer bond by increasing the molecular weight of the liquid crystalline polymer and increasing the degree of crystallinity thereof while also increasing the melting temperature of the polymer.

The article may be thermally treated in an inert atmosphere (e.g., nitrogen, carbon dioxide, argon, helium) or alternatively, in a flowing oxygen-containing atmosphere (e.g., air). It is preferable for such heat treatment to occur in an inert atmosphere to avoid any possible oxidative degradation of the polymer. For instance, the article may be brought to a temperature approximately 10 to 30 centigrade degrees below the melting temperature of the liquid crystalline polymer. It is preferable for the temperature of the heat treatment to be as high as possible without equaling or exceeding the melting temperature of the polymer. It is most preferable to gradually increase the temperature of heat treatment in accordance with the increase of the melting temperature of the polymer during the heat treatment.

The duration of the heat treatment will commonly range from a few minutes to a number of days, e.g., from 0.5 to 200 hours, or more. Preferably, the heat treatment is conducted for a time of 1 to 48 hours and typically from about 5 to 30 hours.

Generally, the duration of heat treatment varies depending upon the heat treatment temperature; that is, a shorter treatment time is required as a higher treatment temperature is used. Thus, the duration of the heat treatment generally can be shortened for higher melting polymers, since higher heat treatment temperatures can be applied without melting the polymer.

The melting temperature of the liquid crystal polymer can be increased from between about 10 to about 50 centigrade degrees as a result of the heat treatment, and preferably from about 20 to about 50 centigrade degrees, with the amount of increase which is obtained being dependent upon the temperature used in the heat treatment, with higher heat treatment temperatures giving greater increases.

The chemical resistance also increases with heat treatment and the solubility in pentafluorophenol, one of the rare solvents for thermotropic liquid crystal polymers continuously decreases with increasing heat treatment time and eventually the material commonly does not dissolve even minimally (such as in amounts of 0.1 percent by weight).

The invention is additionally illustrated in connection with the following Examples which are to be considered as illustrative of the improved adhesive bonding made possible by the present invention. It should understood, however, that the invention is not limited to the specific details of the Examples.

EXAMPLE 1

A thermotropic liquid crystalline polymer comprised of 73 mole percent of a p-oxybenzoyl moiety and 27 mole percent of a 6-oxy-2-napthoyl moiety, as described in U.S. Pat. No. 4,161,470, was employed as a polymeric material for bonding to sodium borosilicate glass, soda lime glass, borosilicate glass, or silica glass. To demonstrate bonding ability these materials were separately employed as particulate materials at a loading of 15 percent by weight which corresponds to about 45 to 50 percent by volume. The pH of the polymers and the pH of the surfaces of the respective fillers were determined by the method described previously, with the pH of the polymer surface being determined to be 6.6 by the use of Phenol Red which changed in color from red to yellowish during the test.

The torque characteristics of the molten polymer which included the particulate material was then determined at a temperature of 300° C. by means of a C.W. Brabender Plasticorder with a 50 ml. electrically heated mixing head, with the difference in torque exhibited by the respective blends and the pH of the fillers being set forth below:

TABLE III

| | Example 1 Results | | |
|---|---|---|---|
| Material | Surface pH | Absolute pH Difference | Torque |
| Na borosilicate glass | 12.0 | 5.4 | 1100 |
| Soda lime glass | 9.0 | 2.4 | 550 |
| Borosilicate glass | 7.2 | 0.6 | 75 |
| Silica glass | 6.8–7.2 | 0.2–0.6 | 100 |

EXAMPLE 2

The procedure of Example 1 was repeated with the exception that the thermotropic liquid crystalline polymer employed was a polyester-amide comprised of 60 mole percent of 6-oxy-2-naphthoyl moiety, 20 mole percent of terephthaloyl moiety, and 20 mole percent of p-oxyphenylamino moiety, as described in U.S. Pat. No. 4,330,457, which was determined to possess a pH of 6.6/7.5 by use of Phenol Red which turned from red to yellowish, Orange II which turned from amber to yellow and Alizarin which did not change in color.

The torque characteristics of the filled polymer were then determined with the results being set forth below:

TABLE IV

| | Example 2 Results | | |
|---|---|---|---|
| Material | Surface pH | Absolute pH Difference | Torque |
| Na borosilicate glass | 12.0 | 5.4 | 2800 |
| Soda lime glass | 9.0 | 2.4 | 900 |
| Borosilicate glass | 7.2 | 0.6 | 0 |
| Silica glass | 6.8 to 7.2 | 0.2 to 0.6 | 0 |

Examples 1 and 2 demonstrate that if the absolute difference between the pH of the surface of the particles to be bonded to the polymer and the pH of the polymer is at least about 1.0 pH unit (as was the case with sodium borosilicate glass and soda lime glass), highly satisfactory adhesion of the polymer thereto is obtained a demonstrated by the increase in torque obtained. A similar improvement in adhesion would be demonstrated in accordance with the present invention when the polymer is bonded to a non-particulate substrate. On the other hand, if the absolute difference is not at least about 1.0 pH unit, unsatisfactory adhesion is obtained (see the borosilicate and silica glass samples).

EXAMPLE 3

A thermotropic liquid crystalline polymer comprised of 73 mole percent of a p-oxybenzoyl moiety and 27 mole percent of a 6-oxy-2-naphthoyl moiety, as described in U.S. Pat. No. 4,161,470, was employed as an adhesive for two aluminum sheets. The surfaces of the aluminum sheets were oxidized in a sulfuric acid/chromic acid admixture [F.P.L. process] and possessed a surface pH of approximately 5. Strips of the liquid crystalline polymer of about 35 mils in thickness were cut from extruded sheets thereof. The polymer was demonstrated to exhibit a surface pH of about 6.6 to 6.8 by the method previously described by use of Phenol Red whereby the indicator changed from red to yellowish in color. The aluminum sheets were heated in a press to 310° C., with a strip of the polymer subsequently being placed between the heated sheets where it was melted and subjected to a pressure of about 100 psi for 10 minutes. The bonded sheets were permitted to cool in a cooling press under a pressure of about 10,000 psi for about 5 minutes. Bond thicknesses varying from about 10 to 15 mils were obtained in various samples by the use of shims between the aluminum sheets of appropriate thickness. The resulting bonded composites were tested for lap shear strength according to ASTM D-1002 with the results being set forth in Table V below:

TABLE V

| Lap Shear Strength of Bonded Composites | | |
|---|---|---|
| Sample | Bond Thickness (mils) | Lap Shear Strength (psi) |
| 1 | 10.0 | 2800 |
| 2 | 10.7 | 2290 |
| 3 | 12.7 | 1610 |
| 4 | 12.8 | 1530 |
| 5 | 15.0 | 1300 |

The data in Table V thus demonstrates that it is highly desirable for the thickness of the adhesive layer t be less than approximately 15 mils and preferably to range from approximately to 12 mils wherein substrates and polymers are employed having the requisite pH characteristics.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

We claim:

1. An improved method for adhesively bonding two substrates together by use of an adhesive comprising:
   (a) providing two substrates which are to be bonded together;
   (b) providing an adhesive composition between and in contact with opposing surfaces of said substrates, said composition comprising a polymer which is capable of forming an anisotropic melt phase and which is heated to a temperature of at least the softening temperature of said polymer, with the proviso that the absolute difference between the pH exhibited by said surfaces of said substrates to be bonded together and the pH of the surface of the polymer is at least approximately 1.0 pH unit; and
   (c) permitting said polymer to cool below said softening temperature to bond said substrates together whereby the thickness of the adhesive composition which constitutes the bond between said substrates is approximately 1 to 15 mils.

2. The improved method of claim 1 wherein said polymer is heated to a temperature of at least the softening temperature of the polymer prior to being placed in contact with said substrates in step (b).

3. The improved method of claim 2 wherein said polymer is heated to a temperature between the softening temperature of the polymer and approximately 20 centigrade degrees in excess of the differential scanning calorimetry melting peak during step (b).

4. The improved method of claim 1 wherein the polymer is heated to at least the differential scanning calorimetry peak melting temperature during step (b).

5. The improved method of claim 1 wherein said polymer is heated to a temperature in excess of the softening temperature of the polymer subsequent to the polymer being placed in contact with said substrates during step (b).

6. The improved method of claim 1 wherein said polymer comprises a wholly aromatic polymer.

7. The improved method of claim 6 wherein said polymer comprises a wholly aromatic polyester.

8. The improved method of claim 7 wherein said polymer comprises a wholly aromatic polyester which comprises not less than about 10 mole percent of recurring units which include a naphthalene moiety.

9. The improved method of claim 8 wherein said wholly aromatic polyester exhibits an inherent viscosity of at least 2.0 dl./g. when dissolved in a concentration of 0.1 percent by weight in pentafluorophenol at 60° C.

10. The improved method of claim 1 wherein the thickness of composition between said substrates is approximately 6 to 12 mils.

11. The improved method of claim 1 wherein said substrates are selected from the group consisting of metals and ceramics.

12. The improved method of claim 1 wherein said adhesive composition is in the form of a sheet and which is heated to a temperature in excess of the softening temperature of said polymer subsequent to being placed in contact with said substrates.

13. The improved method of claim 1 wherein the absolute difference between the pH exhibited by the surfaces of the substrates and the pH of said polymer is at least approximately 2.0 pH units 14. The improved method of claim 1 wherein the absolute difference between the pH exhibited by the surfaces of the substrates and the pH of said polymer is at least approximately 5.0 pH units.

15. The improved method of claim 1 wherein the pH of the surface of said substrate is in the range of approximately 2 to 12.

16. The improved method of claim 1 wherein the pH of the surface of said substrate is in the range of approximately 6 to 8.

17. An article produced in accordance with claim 1.

18. The improved method for the production of a laminate comprising:
   (a) providing a first substrate;
   (b) providing a polymeric composition in contact with at least one surface of said first substrate, said polymeric composition comprising a polymer which is capable of forming an anisotropic melt phase and which is heated to a temperature of at least the softening temperature of said polymer;
   (c) providing a second substrate;
   (d) placing said second substrate in contact with said polymer composition; and
   (e) permitting said polymer to cool below said softening temperature to bond said first and second substrates together whereby the thickness of the resulting polymeric bond ranges from approximately 1 to 15 mils, with the proviso that the absolute difference between the pH of the surface of said first and second substrates which contact said polymer and the pH of said polymer is at least approximately 1.0 pH unit.

19. The improved method of claim 18 wherein said thickness of said resulting polymeric bond ranges from approximately 6 to 12 mils.

20. A laminate produced in accordance with claim 18.

* * * * *